(12) United States Patent
Syed

(10) Patent No.: US 10,284,908 B2
(45) Date of Patent: May 7, 2019

(54) PROVIDING MULTIPLE DATA TRANSMISSIONS

(71) Applicant: Comcast Cable Communications, LLC, Philadelphia, PA (US)

(72) Inventor: Yasser F. Syed, La Crescenta, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 39 days.

(21) Appl. No.: 13/777,830

(22) Filed: Feb. 26, 2013

(65) Prior Publication Data
US 2014/0240319 A1    Aug. 28, 2014

(51) Int. Cl.
*H04N 21/4402* (2011.01)
*H04N 21/2343* (2011.01)

(52) U.S. Cl.
CPC ........... *H04N 21/440272* (2013.01); *H04N 21/23439* (2013.01); *H04N 21/234363* (2013.01)

(58) Field of Classification Search
CPC ....... H04N 19/0046; H04N 21/440272; H04N 21/234363; H04N 21/23439; H04N 21/4402
See application file for complete search history.

(56) References Cited

U.S. PATENT DOCUMENTS

| | | | |
|---|---|---|---|
| 7,356,197 B2 | 4/2008 | Lippincott et al. | |
| 8,836,832 B2* | 9/2014 | Shigeta et al. | 348/296 |
| 2003/0156188 A1* | 8/2003 | Abrams, Jr. | 348/51 |
| 2007/0160153 A1* | 7/2007 | Sullivan | 375/240.29 |
| 2009/0138493 A1* | 5/2009 | Kalaboukis | G06F 17/30017 |
| 2010/0114921 A1* | 5/2010 | Bocharov et al. | 707/758 |
| 2010/0166060 A1* | 7/2010 | Ezure et al. | 375/240.03 |
| 2012/0317308 A1* | 12/2012 | Penner | H04L 65/4092 709/239 |
| 2013/0070859 A1* | 3/2013 | Lu et al. | 375/240.25 |
| 2013/0106998 A1* | 5/2013 | Pahalawatta et al. | 348/43 |
| 2013/0279606 A1* | 10/2013 | Vanam | H04N 19/00854 375/240.27 |

OTHER PUBLICATIONS

Jan Ozer, "The Secret to Encoding High Quality Web Video: Tutorial", published on Jun. 7, 2011. pp. 1-6.*
"Adaptive bitrate streaming," en.wikipedia.org/wiki/Adaptive_bitrate_streaming, printed Jan. 9, 2013, pp. 1-7.
"Discrete cosine transform," http://en.wikipedia.org/wiki/Discrete_cosine_transform, printed Jan. 9, 2013; pp. 1-9.

(Continued)

*Primary Examiner* — Chong Wu
(74) *Attorney, Agent, or Firm* — Banner & Witcoff, Ltd.

(57) ABSTRACT

Methods and systems related to processing multiple data transmissions are disclosed. For example, a computing device may receive a data stream corresponding to a content item, and generate additional data streams by sampling the data stream, for example, using different sampling regions. Another data stream at a higher resolution than each of the additional data streams may then be generated by combining elements (e.g., pixels) of the additional data streams.

20 Claims, 11 Drawing Sheets

(56) References Cited

OTHER PUBLICATIONS

"Series H: Audiovisual and Multimedia Systems; Infrastructure of audiovisual services—Coding of moving video; Advanced video coding for generic audiovisual services," ITU-T Telecommunication Standardization Sector of ITU, H.264, Jun. 2011, pp. 1-686.
"Sidebar: Description of FIR Filters," people.wallawalla.edu/-rob.frohne/qez/sidebar.html; printed Jan. 9, 2013, pp. 1-2.

* cited by examiner

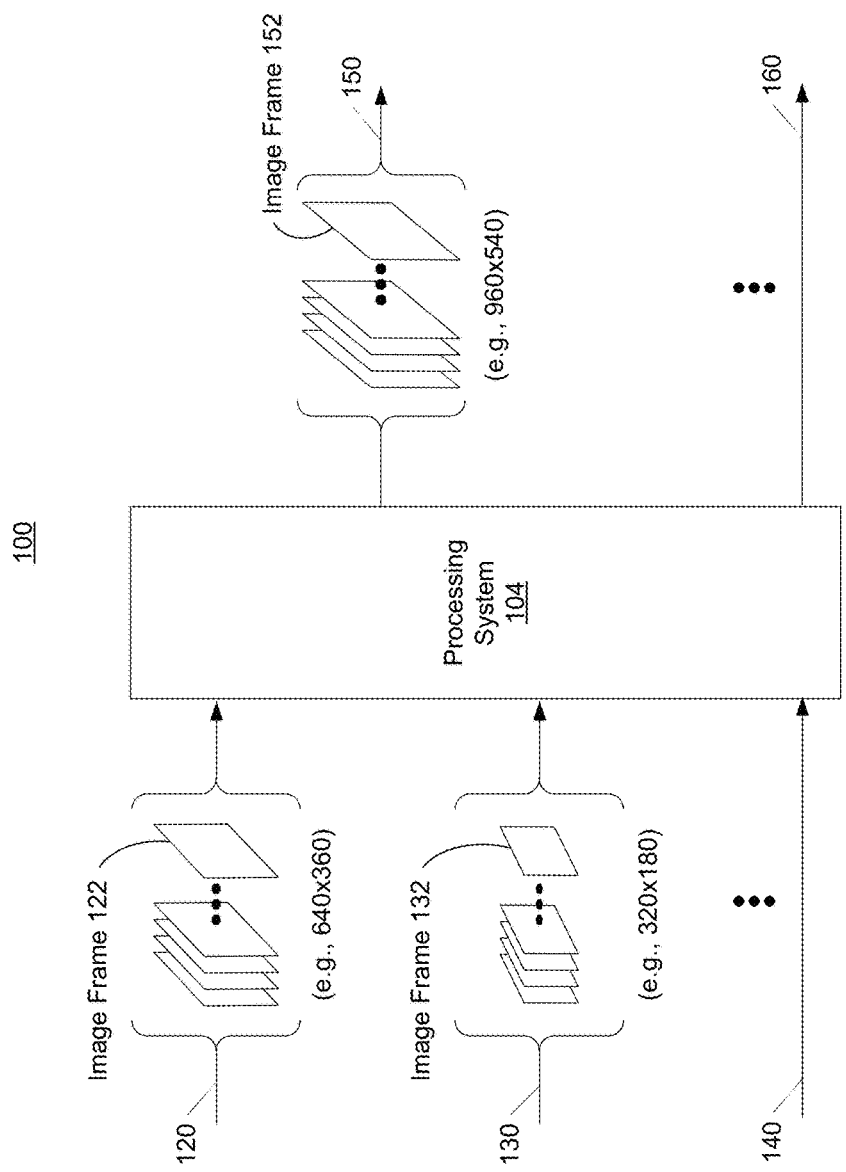

PROVIDING MULTIPLE DATA TRANSMISSIONS

BACKGROUND

Content providers typically utilize multiple data streams to provide content to client devices (e.g., computers, servers, smart phones, tablet computing devices, internet-enabled television sets). For example, a provider may employ Scalable Video Coding (SVC) or adaptive streaming to provide a single piece of content at multiple different resolutions and bit rates to client devices. Maintaining a large number of encoded streams for each piece of content, however, may be costly due to, for example, the increased cost of encoders, rack space, maintenance and monitoring.

One solution is to reduce the number of different streams for each piece of content. However, this approach may result in an unacceptably low number of different resolutions and bit rates for a single piece of content. These and other shortcomings are addressed in this disclosure.

SUMMARY

This summary is not intended to identify critical or essential features of the disclosures herein, but instead merely summarizes certain features and variations thereof. Other details and features will also be described in the sections that follow.

Some features described herein relate to a system that can employ multiple data streams for a content item (e.g., for linear content, video on demand (VOD) content, etc., over internet protocol (IP), QAM, or any form of delivery). Each of the data streams may correspond to different characteristics such as resolution, bit rate, or a combination thereof. In one aspect, the system may encode multiple data streams from a source data stream using different sets of sampling regions, such as offset pixels. The system may combine two or more encoded data transmissions, e.g., streams, to generate an additional data stream at a higher bit rate and/or resolution without requiring, in some instances, an additional encoding process.

In some embodiments, a computing system may include a first computing device for sampling a high resolution, high bit rate data stream, such as a data stream received from a high definition video camera or another capture device, to generate multiple data streams at lower resolutions and/or bit rates. The first computing device may receive a first data stream (e.g., a source data stream) corresponding to a content item. The first data stream may have a first resolution (e.g., a 1920×1080 resolution) and a first bit rate (e.g., 16 megabits per second (Mbps)). The first computing device may generate multiple data streams at different resolutions, bit rates, or both, based on the first data stream. For example, the first computing device may generate a second data stream at a second resolution (e.g., a 640×360 resolution) and a second bit rate (e.g., 750 kilobits per second (kbps)) by sampling the first data stream. The first computing device may also generate a third data stream at a third resolution (e.g., a 320×180 resolution) and a third bit rate (e.g., 250 kbps) by sampling the first data stream using a different set of sampling regions than the sampling regions used to generate the second data stream.

In some aspects, the first data stream may include a plurality of image frames, where each frame includes multiple pixels. The first computing device may generate the second data stream by sampling, for each image frame, a subset of the pixels of the first data stream. For example, the first computing device may generate each pixel (or some of the pixels) of an image frame of the second data stream by processing (e.g., averaging) a subset of pixels of an image frame of the first data stream. The first computing device may generate each pixel of an image frame of the third data stream by determining an average value of a different subset of pixels of the image frame of the first data stream. In some aspects, the first subset and the second subset may include one or more common pixels.

In some embodiments, the computing system may include a second computing device for generating a fourth data stream based on the second and third data streams. For example, the second computing device may generate a fourth data stream at a fourth resolution (e.g., a 960×540 resolution) and a fourth bit rate (e.g., 1 Mbps) by combining the pixels of the second and third data streams. Combining pixels may comprise, for example, filling in empty pixel spaces of the fourth data stream with pixels from the second and third data streams. As a result, the resolution of the fourth data stream may be greater than the resolutions of each of the second and third data streams.

In some aspects, the first computing device may generate a fifth data stream at a fifth resolution and a fifth bit rate by sampling the first data stream. The second computing device may then generate a sixth data stream at a sixth resolution and a sixth bit rate by, for example, combining the third data stream and the fifth data stream.

In some aspects, each of the data streams may be capable of being used by a user device and/or a client device to generate a display or presentation of the content item. For example, each of the data streams may be independently rendered (e.g., without requiring additional data streams such as base or enhancement layers) by one of a plurality of client devices.

In some embodiments, the second computing device may receive a request for a data stream, such as a request for the content item at a resolution equal to the resolution of the fourth data stream, from a client device. In response, the second computing device may initiate generation of the fourth data stream and transmit the fourth data stream to the client device. The second computing device may receive a request for the content item from a client device and determine that one of the data streams may have the greatest resolution that is independently rendered by the client device. For example, the second computing device may determine that the fourth data stream may have the greatest resolution that is independently rendered by the client device. In response, the second computing device may generate the fourth data stream and transmit the fourth data stream to the client device.

BRIEF DESCRIPTION OF THE DRAWINGS

Some features herein are illustrated by way of example, and not by way of limitation, in the figures of the accompanying drawings and in which like reference numerals refer to similar elements.

FIGS. 1A-1D illustrate an example system for providing multiple data streams for a content item.

DETAILED DESCRIPTION

Figure 1A:
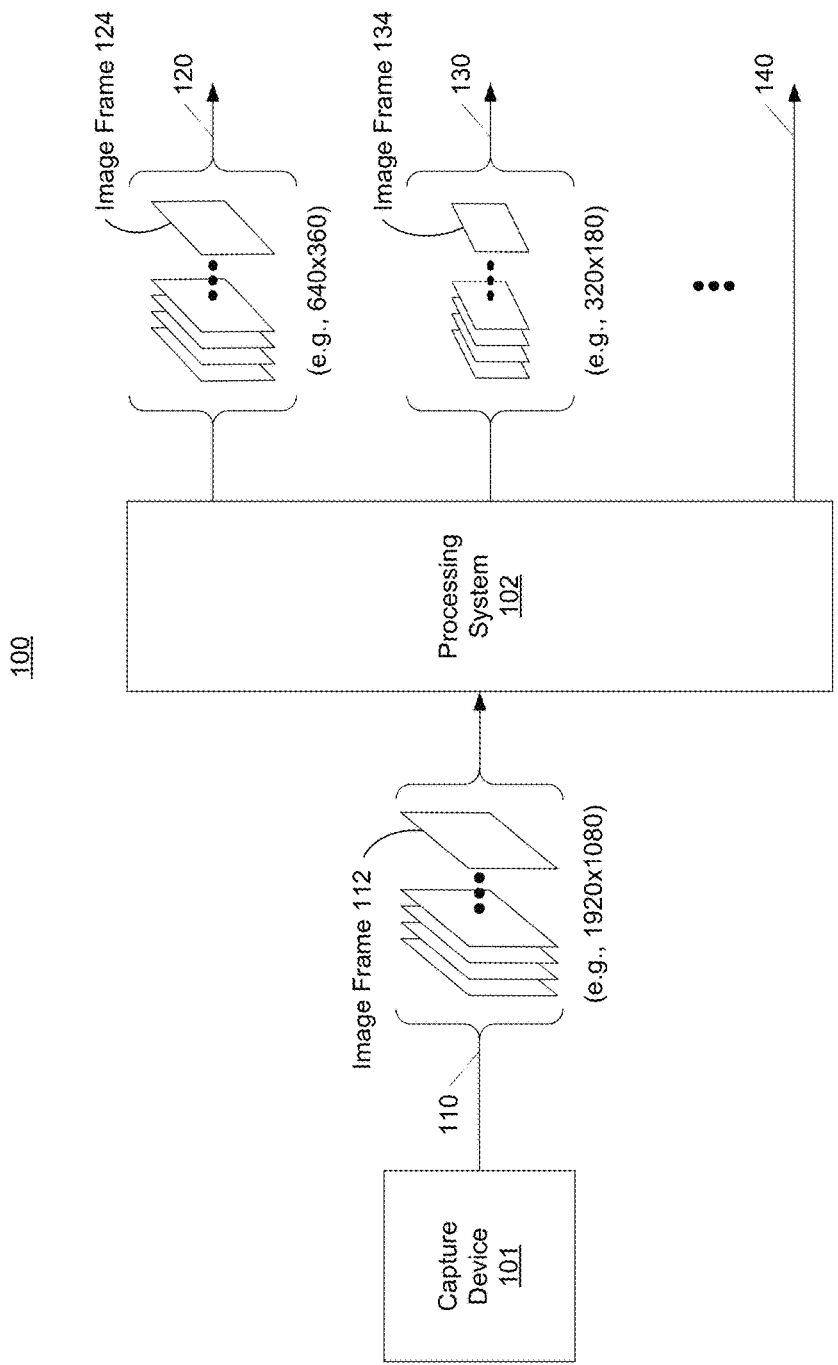

FIGS. 1A-1D illustrate an example system for providing multiple data transmissions (e.g., streams) for a content item in an environment such as a broadcast system, a subscription system, network such as the Internet, or other type of system. System 100 may generate multiple data streams, such as data streams 120 and 130, by sampling a source data stream corresponding to a content item, such as data stream 110 (e.g., a data stream originating from a high definition camera at a high bit rate), using different sampling regions. System 100 may generate one or more data streams, such as data stream 150 (FIG. 1D), by combining two or more of the data streams generated by system 100, such as data streams 120 and 130.

As described herein, content may include, for example, video content, linear content, media on demand (MOD) content, video on demand (VOD) content, streaming video, internet protocol (IP) video, television programs, text listings, graphics, advertisements, and other content. A content item may represent an individual piece of content, such as a particular movie, television episode, online video clip, image, or any other data. In some instances, a content item may be fragmented into segments, such as a plurality of two-second video fragments that may be separately addressed and retrieved.

Returning to FIG. 1A, camera device 101 may include hardware and/or software for generating data stream 110. For example, camera device 101 may comprise a High Definition (HD) digital video camera, and data stream 110 may comprise an HD source data stream corresponding to a particular content item such as a movie. In some instances, a computing device, such as a server, may transmit data stream 110 to processing system 102.

Processing system 102 (e.g., a transcoder) may receive and sample data stream 110 to generate data streams 120 and 130 corresponding to the content item at different resolutions, bit rates, or both. In some instances, processing system 102 may generate any number of additional data streams, such as data stream 140, based on data stream 110. In some instances, the bits per pixel of each of data streams 120, 130, and 140 may be the same or similar. Each data stream may include a plurality of image frames, where each of the image frames includes multiple pixels. For example, data streams 110, 120, and 130 may each include a plurality of image frames, such as image frames 112, 122, and 132, respectively. In some instances, data streams 120 and 130 may have the same resolution and bit rate, but include different image frames 122 and 132, respectively, due to the use of different sampling points in the generation of data streams 120 and 130.

In some embodiments, processing system 102 may generate data streams 120 and 130 by sampling (e.g., downsampling) different pixels of each image frame 112 of data stream 110. Techniques for generating data streams by downsampling a source data stream using different pixels will be discussed in further detail with reference to FIG. 1B.

In some embodiments, processing system 102 may generate data streams 120 and 130 by averaging pixels from different regions of each image frame 112 of data stream 110. For example, processing system 102 may generate each pixel of each image frame 122 of data stream 120 by averaging a subset of pixels of each image frame 112 of data stream 110. Processing system 102 may generate each pixel of each image frame 132 of data stream 130 by averaging a different (e.g., offset) subset of pixels of each image frame 112 of data stream 110. In some instances, data streams 120 and 130 may have the same resolution and bit rate, but include different image frames 122 and 132, respectively, due to the use of offset sampling regions (e.g., different subsets of the pixels of data stream 110) in the generation of data streams 120 and 130. Each of the data streams (120, 130, 140, etc.) and their corresponding image frames may be separately and/or independently viewable. As previously noted, these data streams may be rendered without using additional data streams, such as base or enhancement layers or any of the other streams 120, 130, and 140. Techniques for generating data streams by averaging a source data stream using different sampling regions will be discussed in further detail with reference to FIG. 1C.

Figure 1B:
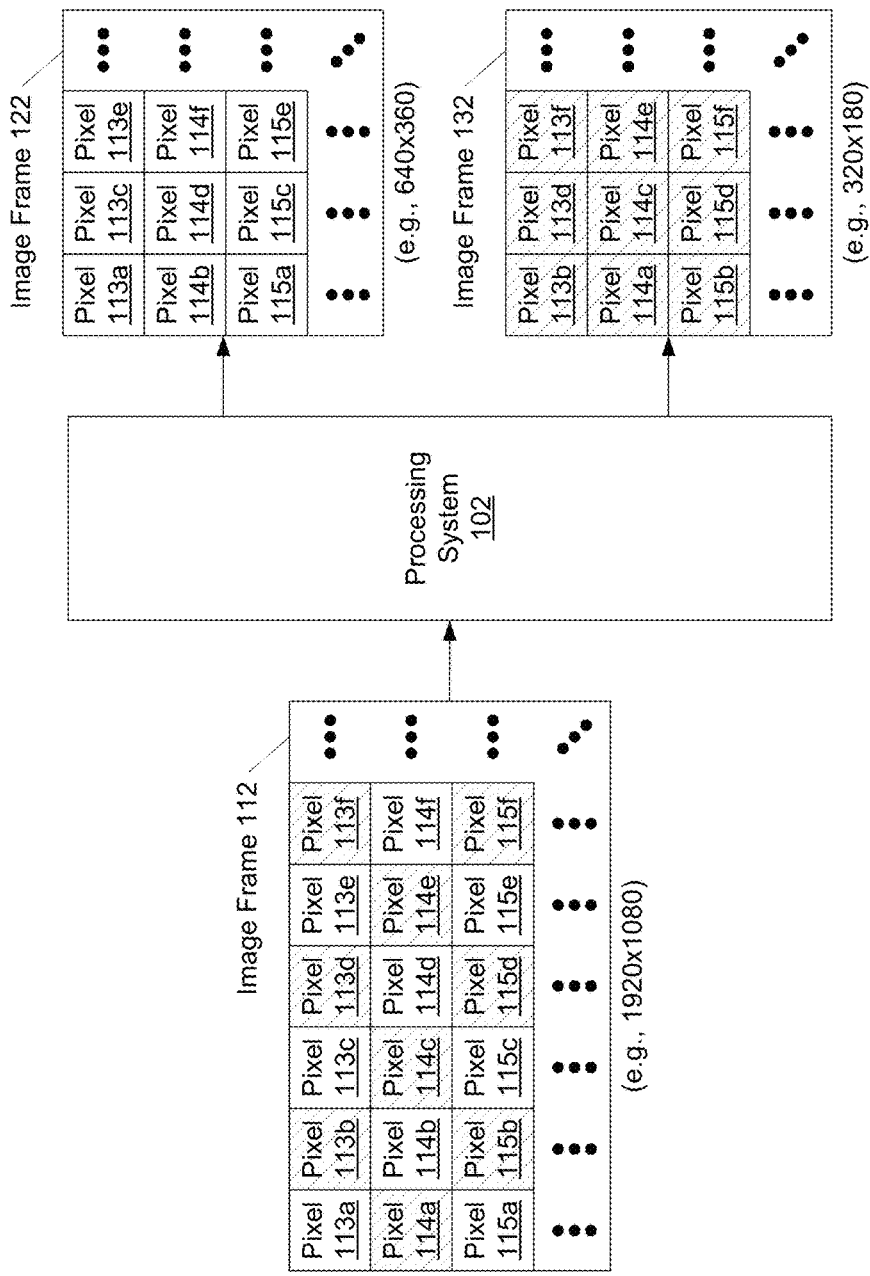

As illustrated in FIG. 1B, processing system 102 may generate image frame 122 of data stream 120 and image frame 132 of data stream 130 by downsampling different pixels of image frame 112 of data stream 110. For example, image frame 112 may include a first row of pixels that includes pixels 113a, 113b, 113c, 113d, 113e, and 113f. It may include a second row of pixels that includes pixels 114a, 114b, 114c, 114d, 114e, and 114f. It may include a third row of pixels that includes pixels 115a, 115b, 115c, 115d, 115e, and 115f. In some instances, image frame 112 may include n rows of m pixels, where n is an integer value greater than one, and where m is an integer value greater than one.

Processing system 102 may generate a first row of pixels of image frame 122 by sampling pixels 113a, 113c, and 113e. It may generate a second row of pixels of image frame 122 by sampling pixels 114b, 114d, and 114f. It may generate a third row of pixels of image frame 122 by sampling pixels 115a, 115c, and 115e. In some instances, image frame 122 may include p rows of q pixels, where p is an integer value greater than one, and where q is an integer value greater than one.

Processing system 102 may generate a first row of pixels of image frame 132 by sampling pixels 113b, 113d, and 113f. It may generate a second row of pixels of image frame 132 by sampling pixels 114a, 114c, and 114e. It may generate a third row of pixels of image frame 132 by sampling pixels 115b, 115d, and 115f. In some instances, image frame 132 may include r rows of s pixels, where r is an integer value greater than one, and where s is an integer value greater than one. In this example, image frames 122 and 132 may comprise orthogonal sets of pixels because there is no overlap between the pixels that form image frame 122 and the pixels that form image frame 132.

Figure 1C:
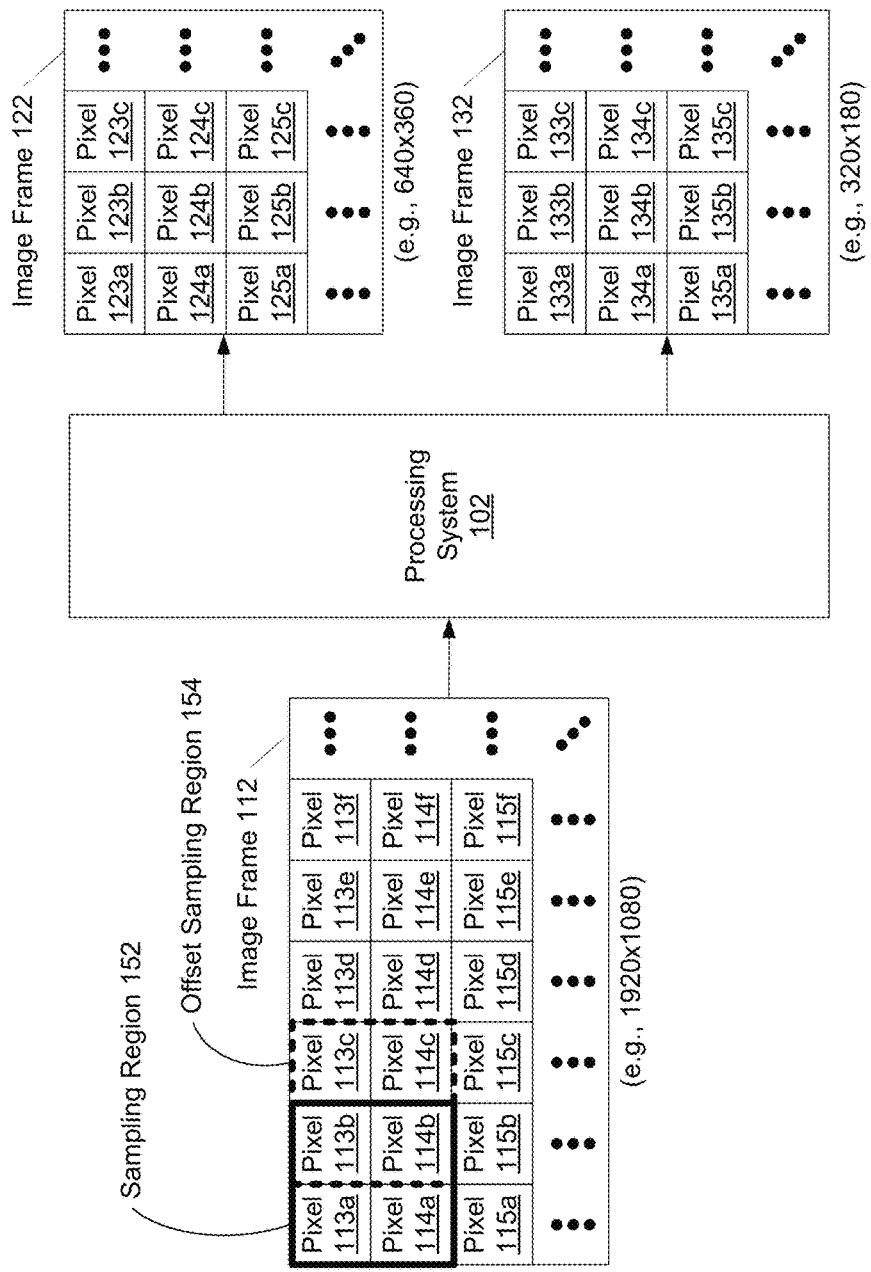

In other embodiments, as illustrated in FIG. 1C, processing system 102 may generate image frame 122 of data stream 120 and image frame 132 of data stream 130 by sampling pixels in different sampling regions of image frame 112. For example, image frame 112 may include two or more different sampling regions (e.g., different subsets of pixels), such as sampling region 152 and offset sampling region 154. In some instances, sampling regions 152 and 154 may include one or more common pixels. For example, pixels 113b and 114b may be common pixels included in both of sampling region 152 and offset sampling region 154. In other embodiments, the regions do not overlap.

In some embodiments, processing system 102 may generate pixel 123a of image frame 122 by averaging two or more pixels in a subset of pixels of image frame 122, such as pixels 113a, 113b, 114a, and 114b in sampling region 152. It may generate pixels 123b, 123c, 124a, 124b, 124c, 125a, 125b, and 125c using techniques similar to those discussed with reference to pixel 123a. For example, it may generate pixel 123b by averaging pixels 113c, 113d, 114c, and 114d. In another example, it may generate pixel 124a by averaging pixels 114a, 114b, 115a, and 115b.

In some embodiments, processing system 102 may generate pixel 133a of image frame 132 by averaging two or more pixels in a different subset of pixels of image frame 122, such as pixels 113b, 113c, 114b, and 114c in offset sampling region 154. It may generate pixels 133b, 133c, 134a, 134b, 134c, 135a, 135b, and 135c using techniques similar to those discussed with reference to pixel 133a. For example, processing system 102 may generate pixel 133b by averaging pixels 113d, 113e, 114d, and 114e. In another example, it may generate pixel 134a by averaging pixels 114b, 114c, 115b, and 115c.

As illustrated in FIG. 1D, processing system 104 (which may comprise part of system 102 or be separate from system 102) may include hardware and/or software for generating one or more data streams, such as data stream 150, by combining two or more of the data streams generated by processing system 102, such as data streams 120 and 130. Data stream 150 may include a plurality of image frames, such as image frame 152. For example, data streams 120 and 130 may correspond to a particular content item, and data stream 150 may correspond to the content item of data streams 120 and 130 (e.g., the content item of data stream 110) at a different resolution, bit rate, or both.

In some embodiments, processing system 104 may combine the pixels of data streams 120 and 130 to generate data stream 150 at a combined higher resolution and/or bit rate. For example, processing system 104 may generate each image frame 152 of data stream 150 by combining the pixels of each image frame 122 of data stream 120 and the pixels of each image frame 132 of data stream 130 in a process essentially the reverse of that shown in FIG. 1B. As a result, the resolution of data stream 150 may be based on a combination of the resolutions of data streams 120 and 130, which may be greater than the resolution of each of data streams 120 and 130.

In some embodiments, processing system 104 may scale (or otherwise adjust the resolution of) each incoming data stream (e.g., data streams 120, 130, and/or 140). After scaling, processing system 104 may combine the pixels of each data stream. For example, processing system 104 may scale up image frames 122 and/or 132 prior to combining them to generate image frame 152. Additionally (or alternatively), processing system may use (or include) one or tap filters to combine data streams 120, 130, and/or 140 (and image frames included therein) to generate data stream 150 (and image frames included therein).

The data streams 120, 130, and/or 140 may comprise orthogonal sets of pixels. For example, the pixels of image frame 122 might not overlap with any of the pixels of image frame 132, and the resulting image frame 152 may comprise the pixels from image frame 122 and the orthogonal set of pixels from image frame 132. In some embodiments, the data streams 120, 130, and/or 140 may comprise near-orthogonal sets of pixels, so there may be some overlap between, for example, the pixels of image frames 122 and 132.

Returning to FIG. 1A, data stream 110 may correspond to a content item at a 1080HD resolution (e.g., 1920×1080) and a bit rate of 7-10 Mbps, 16 Mbps, or any other bit rate. Processing system 102 may receive data stream 110 and downsample data stream 110 to generate data stream 120, which may correspond to the content item at a ⅓ 1080HD resolution (e.g., 640×360) and a bit rate of 750 kbps. It may sample data stream 110 using an offset sampling region to generate data stream 130, which may correspond to the content item at a ⅙ 1080HD resolution (e.g., 320×180) and a bit rate of 250 kbps. Processing system 102 may transmit data streams 120 and 130 to processing system 104 (FIG. 1D) or to an intermediate device communicatively coupled to processing system 104. Processing system 104 may receive and combine data streams 120 and 130 to generate data stream 150, which may correspond to the content item at a ½ 1080HD resolution (e.g., 960×540) and a bit rate of 1 Mbps (e.g., based on the combination of the bit rates of 750 kbps and 250 kbps).

Bit rate of output streams, such as of processing system 102 or 104, may be controlled by controlling the number of frames sent per second, the number of pixels in each frame (based on sampling), and/or the information rate for each pixel (e.g., 1.1 bits per pixel). For example, the data streams 120, 130, and 140 may be encoded with the same bits per pixel (e.g., 1.1 bits per pixel). Alternatively, the data streams may be encoded with substantially similar bits per pixel. For example, the bits per pixel of the streams may be maintained within a threshold of a target bits per pixel (e.g., 1.1±0.1 bits per pixel) or within a threshold of one another (e.g., the bits per pixel of each of the data streams may be allowed to deviate by 0.1 bits per pixel from the bits per pixel of one or more of the other data streams). The bit rate of the output data stream 150 (FIG. 1D) may be adjusted via quantization, motion vectors, etc. Furthermore, processing system 104 may maintain and/or adjust the bit rate of the output stream using the same bits per pixel of the input data streams 120, 130, and/or 140. With more information used to generate the output data stream 150 (e.g., information from independently viewable data streams 120, 130, and/or 140), the more accurate the output data stream may be for the selected bits per pixel.

In another illustrative example, each of data streams 120 and 130 may correspond to the content item at a 2K resolution (e.g., 2048×1080) but using different pixels. Processing system 104 may combine data streams 120 and 130 to generate data stream 150 corresponding to the content item at a 4K resolution (e.g., 4096×2160). In other variations, the data streams may have the same bit rate and resolutions but are sampled using different pixels. Numerous variations are possible. For example, a 1920×1080 stream may be sampled into two different 960×540 streams (using every other pixel) or two different 640×360 streams (using every third pixel). As another example, a 1080p stream may be sampled into a 1080i (even) stream and its complement (odd) 1080i stream. Each of the 1080i streams may be independently viewable. As will be described below, the two 1080i streams may be combined to recreate the 1080p stream for a more accurate picture.

Returning to FIG. 1D, processing system 104 may generate any number of additional data streams, such as data stream 160, based on data streams 110, 120, 130, 140, 150, any additional data streams, and any combinations thereof. For example, processing system 104 may generate data stream 160 corresponding to the content item at a different resolution, bit rate, or both, by combining data streams 140 and 150. In another example, processing system 104 may generate data stream 160 by combining data streams 120, 130, and 140. In another example, processing system 104 may generate an additional data stream by combining data streams 150 and 160.

In some aspects, each of data streams 110, 120, 130, 140, 150, 160, and additional data streams may be capable of being used by a client device (e.g., set top box 313 or other devices shown in FIG. 3, computer 314, laptop 315, wireless device 316, wireless device 317, and any device capable of processing video or image data) to generate a display of the content item. For example, each of data streams 110, 120, 130, 140, 150, 160, and additional data streams may be independently rendered (e.g., without requiring additional data streams such as base or enhancement layers) by one of a plurality of client devices.

In some embodiments, processing system 104 may receive a request for a data stream, such as data stream 150, from a computing device, such as client device (described below with respect to FIGS. 2 and 3). For example, processing system 104 may receive a request from a client device for the content item at a resolution equal to the resolution of data stream 150. In response, processing system 104 may access data streams 120 and 130, which may be stored in memory, and initiate generation of data stream 150. Once data stream 150 or a portion thereof has been generated, processing system 104 may transmit data stream 150 to the client device.

One advantage of storing data streams 120 and 130 instead of (or, in some cases, in addition to) data stream 110 (e.g., for VOD or DVR, such as cloud DVR services) is that data streams 120 and 130, combined, may require less storage space than data stream 110. Another advantage is that the greater number of data streams at different resolutions and/or bit rates may support a greater number of devices/display sizes without having to re-encode data streams. For example, if a mobile device is capable of rendering images up to 640×360, data stream 120 may be delivered directly to the mobile device without re-encoding data stream 110, which is at 1920×1080, to the proper lower resolution.

In some embodiments, processing system 104 may determine a data stream to be provided to a computing device. For example, processing system 104 may determine that data stream 150 has the greatest resolution that is independently rendered by the client device. For example, data stream 150 may have a resolution of 960×540 and processing system 104 may determine that the client device is capable of independently rendering resolutions less than or equal to 960×540. In response, processing system 104 may access data streams 120 and 130, which may be stored in memory, and generate data stream 150. Once data stream 150 or a portion thereof has been generated, processing system 104 may transmit data stream 150 to the client device.

Figure 2:
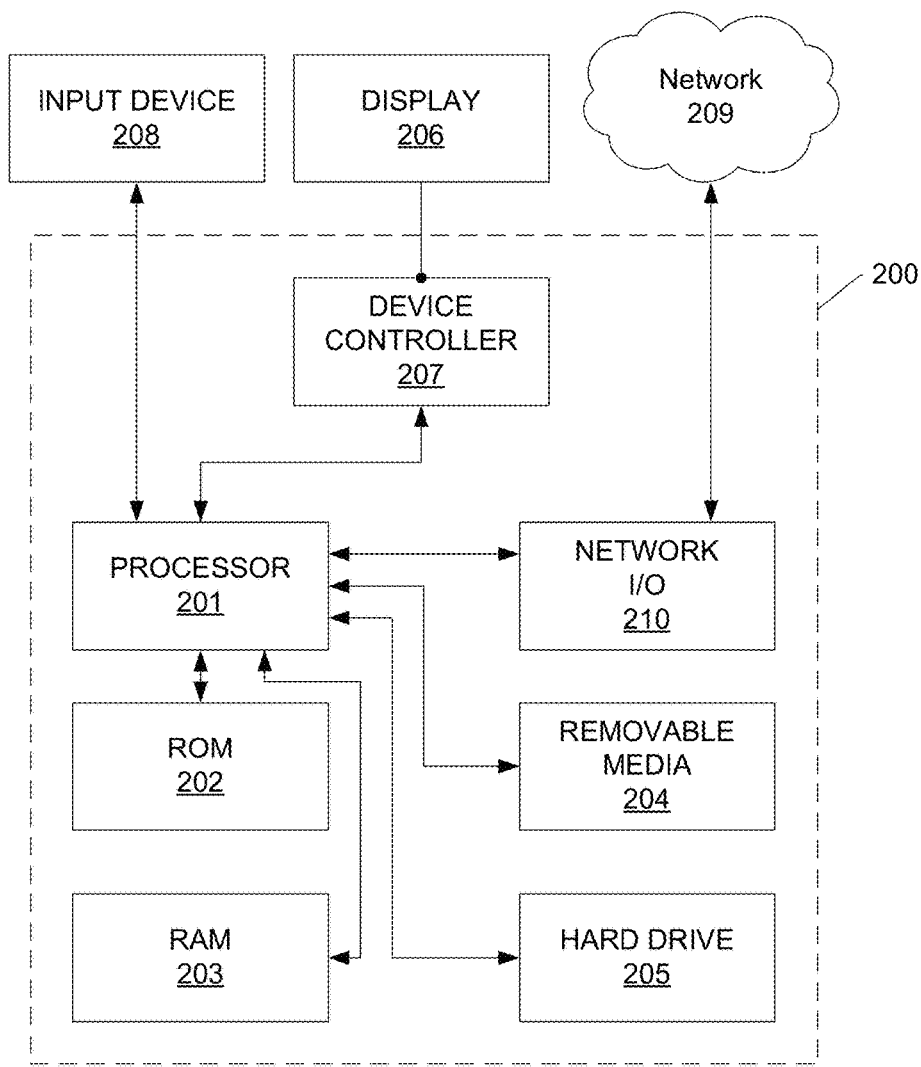
FIG. 2 illustrates an example software and hardware device on which various elements described herein can be implemented.

The various features shown in FIGS. 1A-1D may be implemented using hardware and/or software, such as device 200 shown in FIG. 2. The various components shown in FIGS. 1A-1D may be communicatively coupled using any communication links, such as communication links 301 shown in FIG. 3, and/or networks, such as one or more external networks 209 shown in FIGS. 2-3. In some aspects, the physical arrangement of the components in system 100 may be different than the arrangements shown in FIGS. 1A-1D. For example, each of the components may be coupled through one or more communication networks, such as one or more external networks 209, via a respective router. In some aspects, the features and components described with reference to system 100 may be included in a single computing device. In some aspects, the features and components described with reference to system 100 may be distributed among multiple devices using one or more communication links, networks, or both.

Figure 5A:
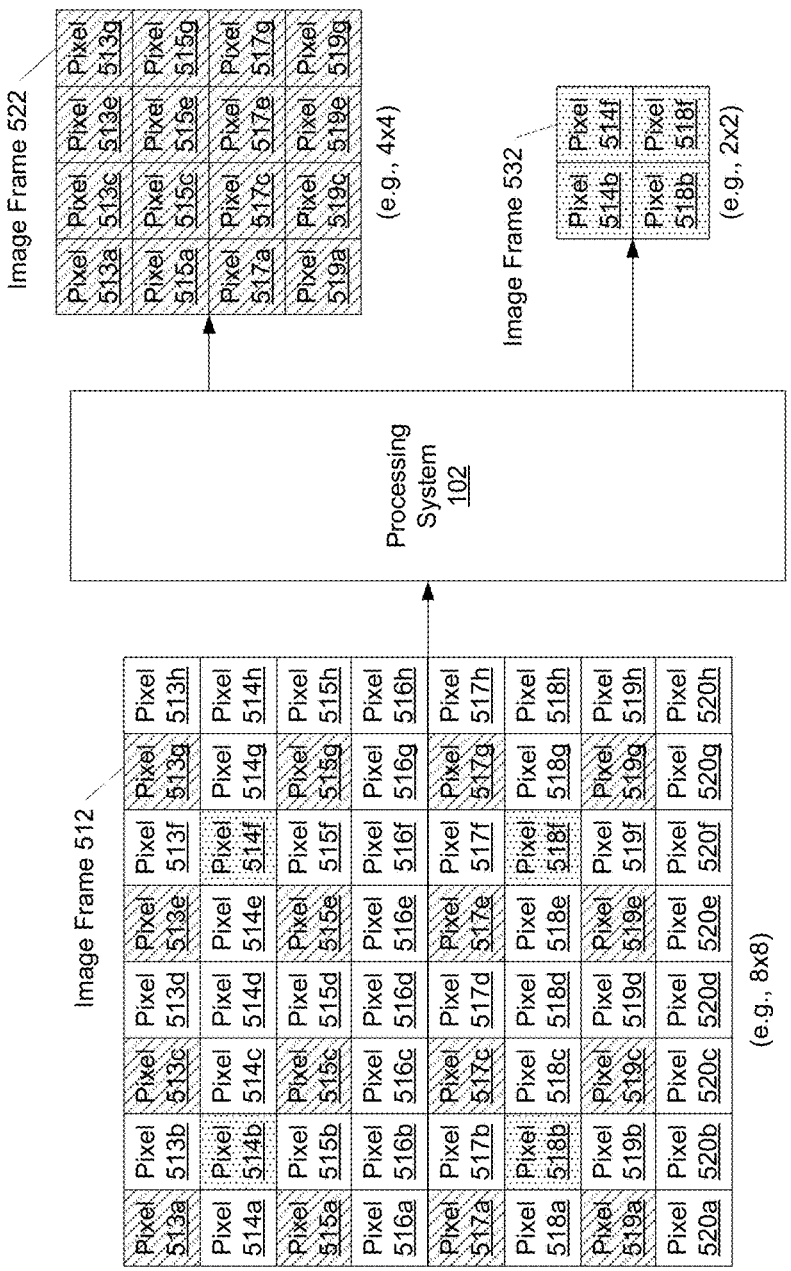
FIGS. 5A-5B illustrate an example system for providing multiple data streams for a content item.
Figure 5B:
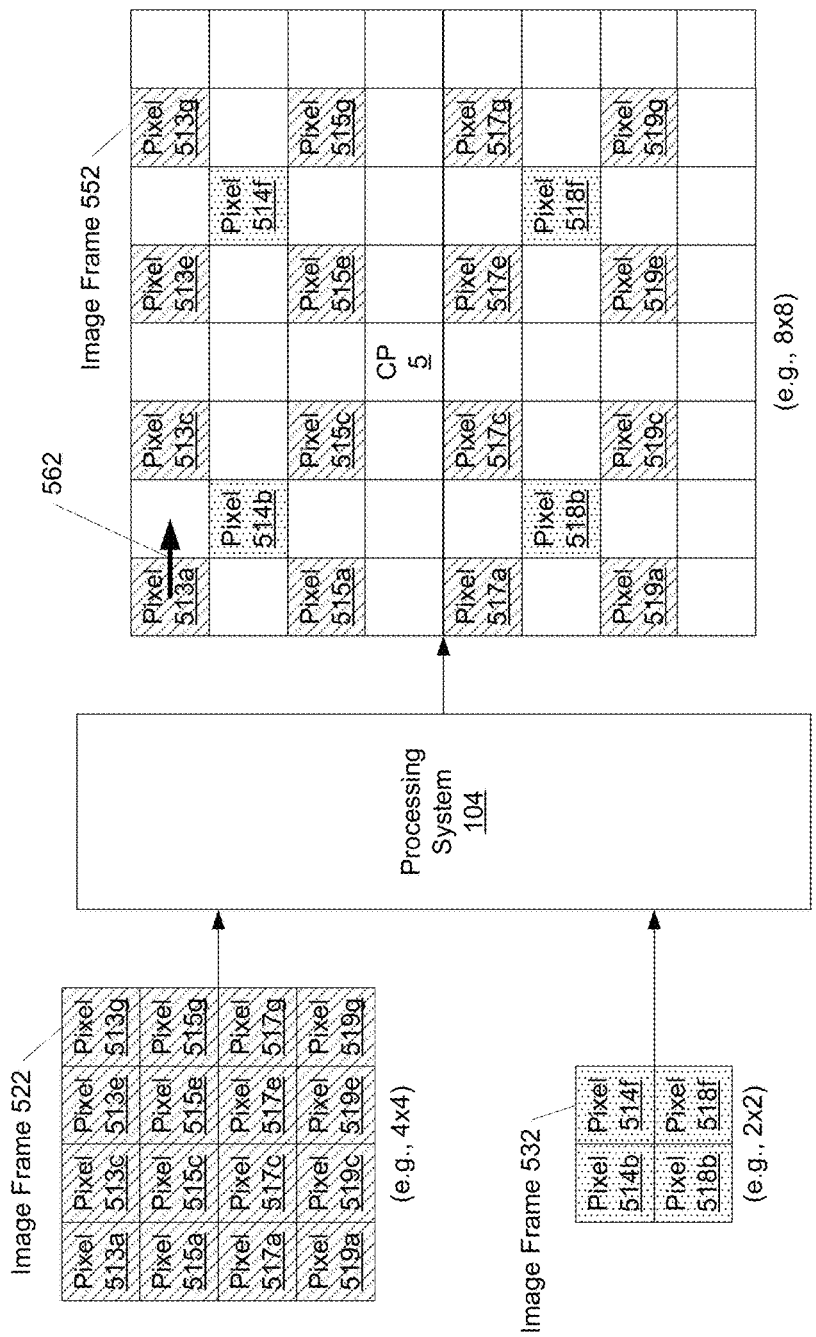

FIGS. 5A-5B illustrate another example system for providing multiple data streams for a content item. Referring first to FIG. 5A, the system 100, as described herein, may generate multiple image frames, such as image frame 522 and image frame 532, by sampling a source image frame corresponding to a content item, such as image frame 512. As illustrated, source image frame 512 comprises an 8 pixel by 8 pixel image (having pixels 513a-h, 514a-h, 515a-h, 516a-h, 517a-h, 518a-h, 519a-h, and 520a-h), image frame 522 comprises a 4 pixel by 4 pixel image, and image frame 532 comprises a 2 pixel by 2 pixel image. These image frame dimensions are merely exemplary, and these dimensions might only be a portion of an actual image frame. For example, the 8×8 image frame 512 may comprise a portion of the 1920×1080 image frame 112 illustrated in FIG. 1B, the 4×4 image frame 522 may comprise a portion of the 640×360 image frame 122, and the 2×2 image frame 532 may comprise a portion of the 320×180 image frame 132.

The processing system 102 may downsample image frame 512 to generate image frame 522 and/or image frame 532. For example, processing system 102 may generate a first row of pixels of image frame 522 by sampling pixels 513a, 513c, 513e, and 513g. It may generate a second row of pixels of image frame 522 by sampling pixels 515a, 515c, 515e, and 515g. It may generate a third row of pixels of image frame 522 by sampling pixels 517a, 517c, 517e, and 517g. It may generate a third row of pixels of image frame 522 by sampling pixels 519a, 519c, 519e, and 519g. In this example, the sampling may be evenly distributed across the source image frame 512 (e.g., sampling every other pixel of image frame 512 to generate image frame 522).

Similarly, processing system 102 may generate a first row of pixels of image frame 532 by sampling pixels 514b and 514f. It may generate a second row of pixels of image frame 532 by sampling pixels 518b and 518f. The sampling may be evenly distributed across the source image frame 512 (e.g., sampling every fourth pixel of image frame 512 to generate image frame 532). Image frames 522 and 532 may comprise orthogonal sets of pixels with no overlapping pixels between the two frames. Furthermore, each of the image frames 522 and 532 may be separately viewable. For example, image frame 532 may be displayed on a smaller display, such as a cell phone display. Image frame 522 may be displayed on a larger display, such as a television screen.

As illustrated in FIG. 5B, processing system 104 may generate one or more image frames, such as image frame 552, by combining two or more of the image frames generated by processing system 102, such as image frames 522 and 532. By combining two smaller image frames 522 and 532, the processing system 104 may generate a higher resolution image frame 552. In particular, image frame 552 may comprise a combination of two orthogonal sets of pixels, the pixels of image frame 522 and the pixels of image frame 532, none of which overlap. Image frame 522 may appear substantially similar to the original image frame 512 by setting the center point for combining the pixels of image frame 522 and image frame 532 at the position referenced by CP 5. The processing system 104 may fill the empty pixel spaces in image frame 552 by duplicating (or interpolating from) a nearby pixel (e.g., adjacent pixel), as illustrated by arrow 562 for duplicating pixel 513a, taking an average of nearby pixels, and any other techniques. For example, processing system 104 may convert the 7×7 pixel image frame 552 into an 8×8 pixel image frame by filling in the empty pixel spaces in the right-most column and bottom-most row. In some aspects, non-linear approximations for filling the empty pixel spaces may be more accurate than approximations using linear interpolation or tap filtering.

Figure 6A:
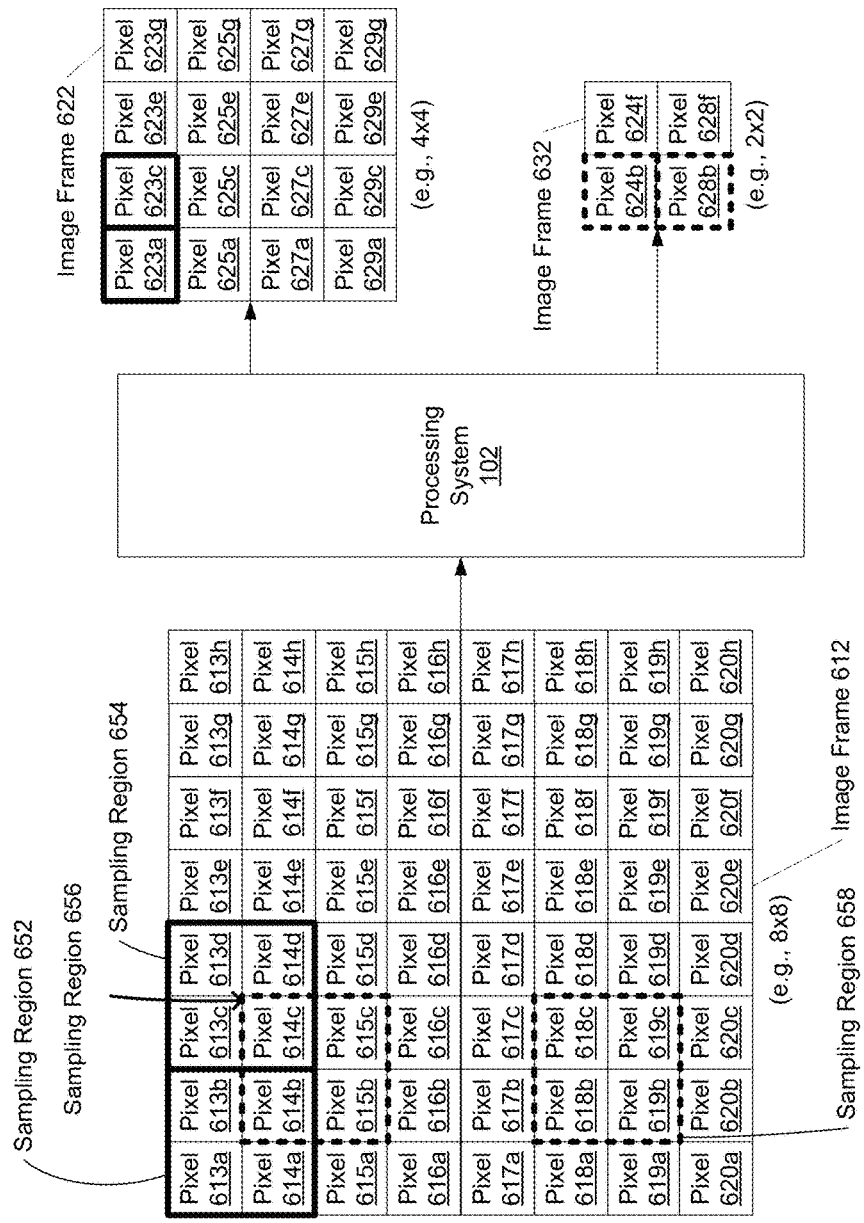
FIGS. 6A-6B illustrate another example system for providing multiple data streams for a content item.
Figure 6B:
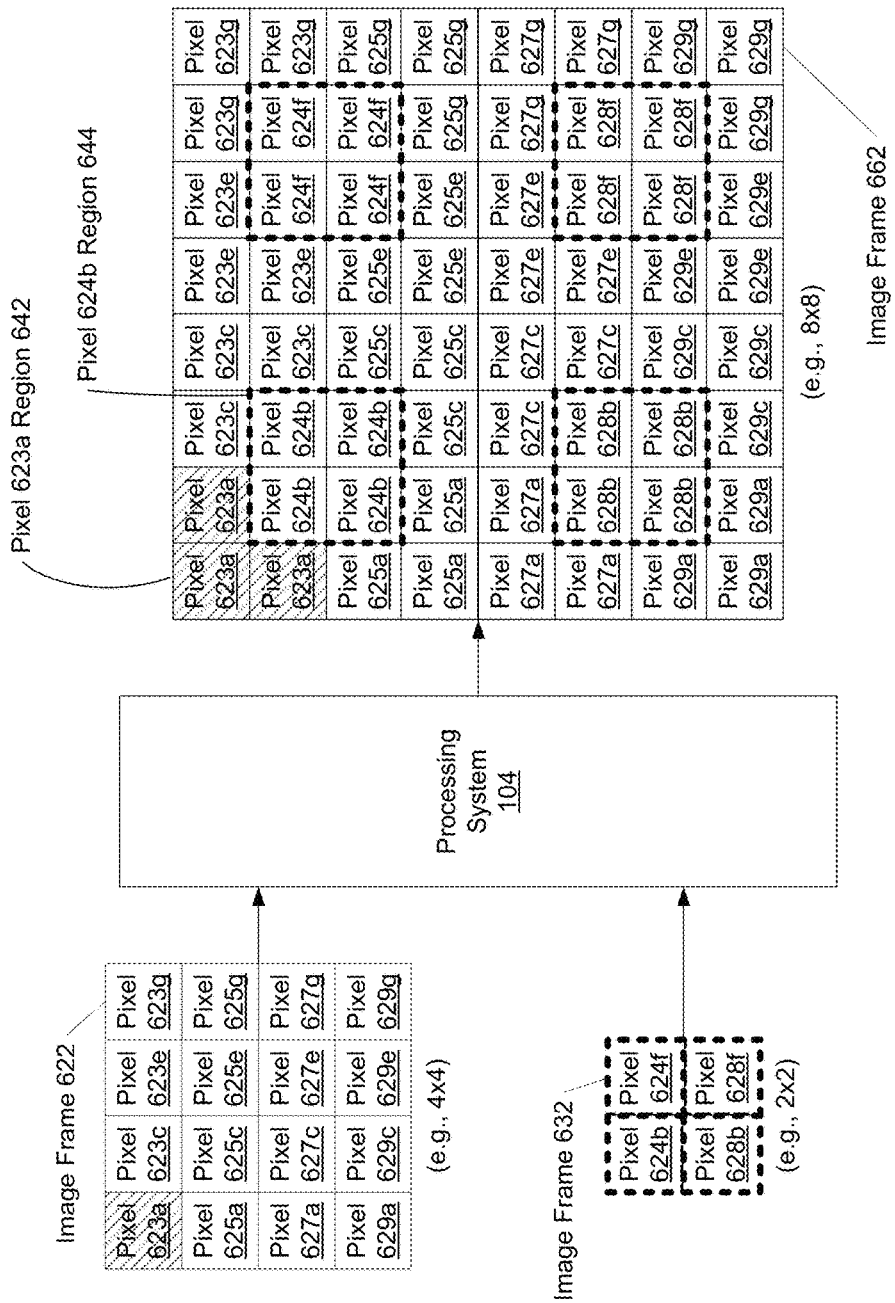

FIGS. 6A-B illustrate an additional example system for providing multiple data streams for a content item, such as by sampling (downsampling or upsampling) pixels in different sampling regions of an image frame. Referring first to FIG. 6A, processing system 102 may generate image frame 622 and/or image frame 632 by sampling pixels in different sampling regions of image frame 612 (having pixels 613a-h, 614a-h, 615a-h, 616a-h, 617a-h, 618a-h, 619a-h, and 620a-h). Sampling pixels in different sampling regions was previously discussed, and the sampling illustrated in FIG. 6A provides another example of the sampling described herein. Processing system 102 may generate pixel 623a of image frame 622 by averaging pixels 613a, 613b, 614a, and 614b in sampling region 652. It may generate pixel 623c of image frame 622 by averaging pixels 613c, 613d, 614c, and 614d in sampling region 654. It may generate pixels 623e, 623g, 625a, 625c, 625e, 625g, 627a, 627c, 627e, 627g, 629a, 629c, 629e, and 629g using similar techniques.

Processing system 102 may generate pixel 624b of image frame 632 by averaging pixels 614b, 614c, 615b, and 615c in sampling region 656. It may generate pixel 628b of image frame 632 by averaging pixels 618b, 618c, 619b, and 619c in sampling region 658. It may generate pixels 624f and 628f using similar techniques.

As illustrated in FIG. 6B, processing system 104 may generate one or more image frames, such as image frame 662, by combining two or more of the image frames generated by processing system 102, such as image frames 622 and 632. To generate region 642 (comprising three pixel spaces in image frame 662), processing system 104 may fill the three pixel spaces with pixel 623a. To generate region 644 (comprising four pixel spaces in image frame 662), processing system 104 may fill the four pixel spaces with pixel 624b. The processing system 104 may fill the remaining pixel spaces in image frame 662 using a similar technique. In another embodiment, region 642 may comprise four pixels, and region 644 may comprise three pixels. Therefore, the pixel 624b in the upper left-hand corner of region 644 may be replaced with pixel 623a.

In some embodiments, instead of generating the image frame 662, processing system 104 may generate image frame 552 illustrated in FIG. 5B (using the pixels of image frames 622 and 632 instead of 522 and 532). Similarly, processing system 104 may combine the image frames 522 and 532 to generate image frame 662 illustrated in FIG. 6B (using the pixels of image frames 522 and 532 instead of 622 and 632).

FIG. 2 illustrates general hardware elements and software elements that can be used to implement any of the various computing devices and/or software discussed herein, including systems 102 and 104. Device 200 may include one or more processors 201, which may execute instructions of a computer program to perform any of the functions and steps described herein. The instructions may be stored in any type of non-transitory computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206 (e.g., an external monitor or television), and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with one or more external networks 209. One or more external networks 209 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. The network interface may be a wired interface, wireless interface, or a combination of the two. In some embodiments, network I/O interface 210 may include a cable modem, and network 209 may include the communication links 301 shown in FIG. 3, one or more external networks 209, an in-home network, a provider's wireless, coaxial, fiber, or hybrid fiber/coaxial distribution system (e.g., a DOCSIS network), or any other desired network.

Figure 3:
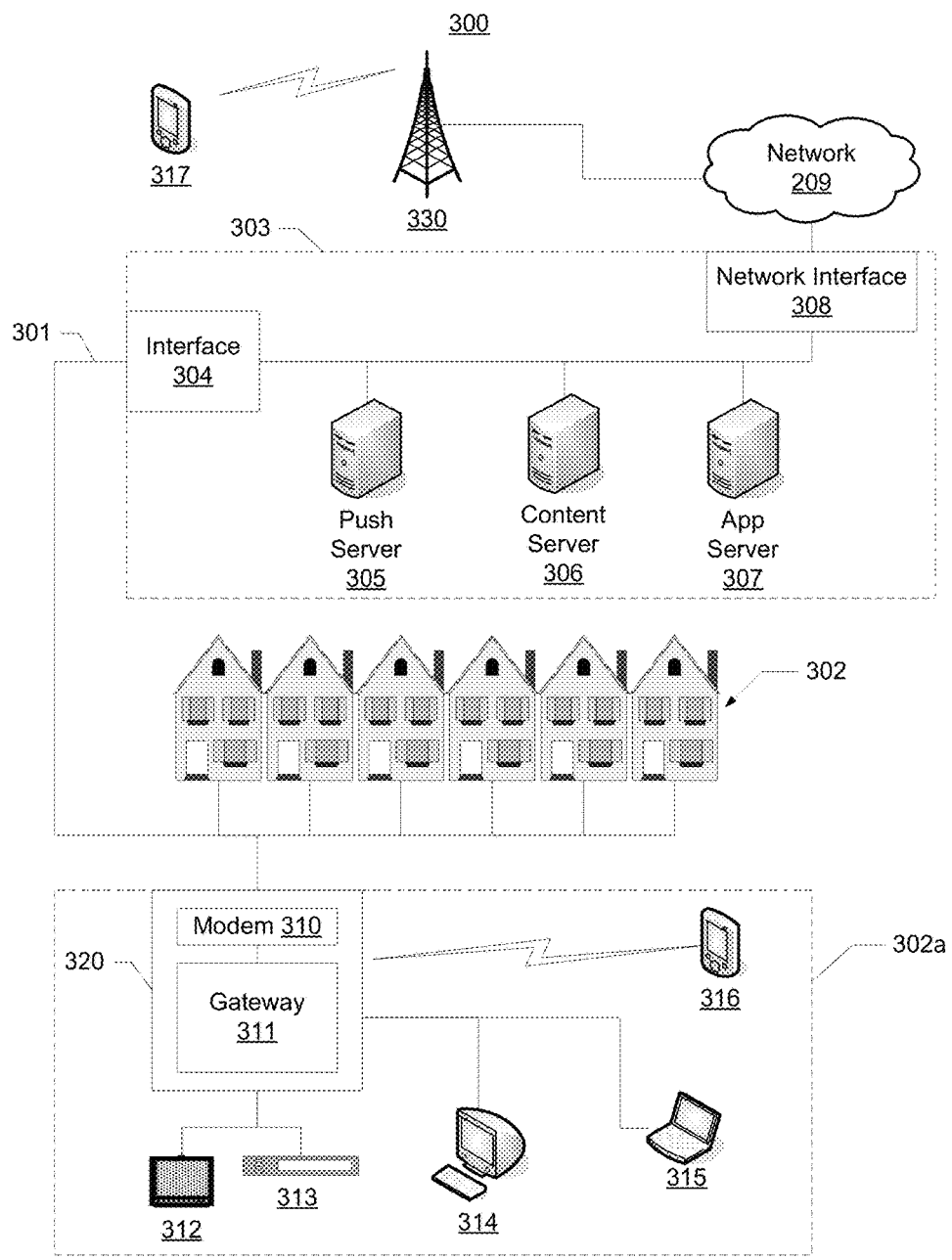
FIG. 3 illustrates an example network environment.

FIG. 3 illustrates an example information distribution network 300 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 300 may comprise a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, network 300 may comprise a cellular broadband network communicating with multiple communication access points, such as wireless communication tower 330, to provide communication signals to devices such as wireless device 317 (e.g., a mobile phone, a wireless laptop, a tablet computer, a portable gaming device). In another example, network 300 may be a coaxial system comprising a modem termination system (e.g., a cable mode termination system (CMTS)) communicating with numerous gateway interface devices (e.g., gateway interface device 311 in example home 302a). Network 300 may use a series of interconnected communication links 301 (e.g., coaxial cables, optical fibers, wireless links, etc.) to connect premises such as homes 302 or other user environments to local office 303.

Local office 303 may include interface 304, which may be a computing device configured to manage communications between devices on the network of communication links 301 and backend devices, such as server 305, server 306, and server 307. Local office 303 may include one or more network interfaces 308 for communicating with one or more external networks 209.

Local office 303 may include a variety of servers that may be configured to perform various functions. Local office 303 may include one or more push servers 305 for generating push notifications to deliver data to devices that are configured to detect such notifications. Local office 303 may include one or more content servers 306 configured to provide content (e.g., data streams 110, 120, 130, 140, 150, 160) to devices. Local office 303 may include one or more application servers 307, which may be used, in some instances, to implement processing device 104. Local office 303 may be communicatively coupled to processing system 102 through one or more external networks 209. In other embodiments, local office 303 may be communicatively coupled to both of processing systems 102 and 104 through one or more external networks 209.

Homes 302 such as home 302a may include an interface 320, which may include device 310, for communicating on communication links 301 with local office 303, one or more external networks 209, or both. In certain implementations, device 310 may be a part of, or communicatively coupled to, gateway interface device 311 (e.g., a wireless router, a set-top box, a computer server).

Gateway 311 may include local network interfaces to provide communication signals to client devices in or near example home 302a, such as television 312, set-top box 313, personal computer 314, laptop computer 315, wireless device 316 (e.g., a wireless laptop, a tablet computer, a mobile phone, a portable gaming device), a vehicular computing system (e.g., a mobile computing system, navigation system, or entertainment system in an automobile, marine vessel, or aircraft) and any other device.

Figure 4:
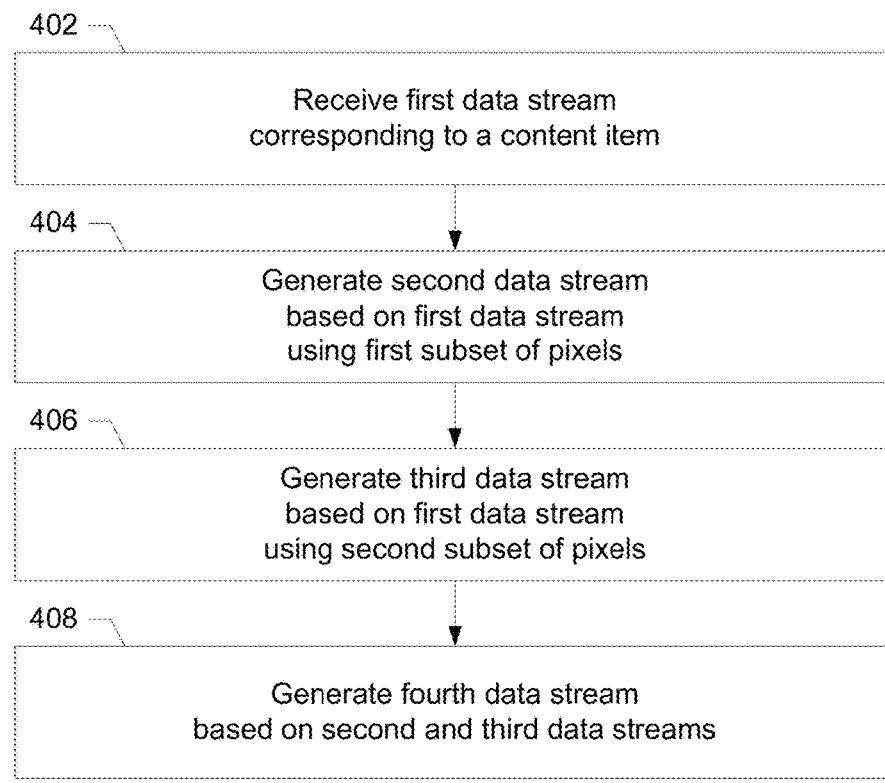
FIG. 4 illustrates an example process flow for providing multiple data transmissions, e.g., streams, for a content item.

FIG. 4 illustrates an example process flow for providing multiple data transmissions, e.g., streams, for a content item using, for example, the techniques described with reference to FIGS. 1A-1D.

At step 402, a first computing device (e.g., processing system 102) receives or accesses a first data stream corresponding to a content item. For example, the first computing device may receive data stream 110 corresponding to a first resolution (e.g., 1920×1080) and a first bit rate (e.g., 16 Mbps).

At step 404, the first computing device may generate a second data stream corresponding to the content item. For example, the first computing device may generate data stream 120, which may correspond to a second resolution (e.g., 640×360) and a second bit rate (e.g., 750 kbps), by downsampling the first data stream. As previously described with reference to FIGS. 1A-1D, the second data stream 120 may be generated from a first subset of pixels of the first data stream.

At step 406, the first computing device may generate a third data stream corresponding to the content item. For example, the first computing device may generate data stream 130, which may correspond to a third resolution (e.g., 320×180) and a third bit rate (e.g., 250 kbps), by downsampling different pixels of the first data stream. As previously described with reference to FIGS. 1A-1D, the third data stream 130 may be generated from a second subset of pixels of the first data stream. In some instances, while the source for each of the second and third data streams may be the same (e.g., the first data stream), the sampling regions used to generate the second and third data streams may be different (e.g., offset).

At step 408, a second computing device (e.g., processing system 104) may generate a fourth data stream corresponding to the content item. For example, the second computing device may generate data stream 150, which may correspond to a fourth resolution (e.g., 960×540) and a fourth bit rate (e.g., 1 Mbps), by combining the second and third data streams (e.g., by using pixels from both the second and third data streams to generate the fourth data stream 150).

With the features described above, various advantages may be achieved. For example, multiple data streams may be generated from a source data stream using different sampling points or regions. The multiple data streams may be combined to generate a higher resolution data stream without, in some instances, encoding a new data stream. In some instances, the systems, methods, and techniques described herein may provide the capability to support future technological advances, such as increases in the processing capabilities of client devices, without increasing the number of data streams that require encoding. In some instances, the systems, methods, and techniques described herein may be included in a system that stores multiple bit rate fragmentation files in one superfile using a Scalable Video Codec (SVC) construct.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
   receiving, by a computing device, a first data stream corresponding to a content item associated with a first resolution, the first data stream comprising a plurality of first image frames, wherein each of the first image frames comprises a plurality of pixels;
   encoding, by the computing device, a plurality of data streams for the content item, wherein the plurality of data streams comprises:
      a second data stream comprising a plurality of second image frames, wherein each of the second image frames comprises a first unique subset of the plurality of pixels, and wherein a first bit rate of the first data stream is the same as a second bit rate of the second data stream, and
      a third data stream comprising a plurality of third image frames, wherein each of the third image frames comprises a second unique subset of the plurality of pixels,
   wherein, for each of the plurality of data streams, the computing device is configured to maintain a bits per pixel value of a corresponding data stream within a threshold of a second bits per pixel value of another data stream of the plurality of data streams;
   receiving, by the computing device and from a user device, an indication of a request for the content item at a second resolution that is lower than the first resolution;
   determining, by the computing device and based on the indication, that interleaving the first unique subset of the plurality of pixels with the second unique subset of the plurality of pixels generates the content item at the second resolution; and
   sending, by the computing device and to the user device, the second data stream and the third data stream.

2. The method of claim 1,
   wherein the second data stream comprises the plurality of second image frames at a third resolution and the third data stream comprises the plurality of third image frames at a fourth resolution,
   wherein the third resolution is different from the fourth resolution, wherein the second data stream is configured to independently cause one or more user devices to render a presentation of the content item at the third resolution, and wherein the third data stream is configured to independently cause the one or more user devices to render the presentation of the content item at the fourth resolution.

3. The method of claim 1, wherein encoding the plurality of data streams further comprises:

determining, by the computing device, the first unique subset of the plurality of pixels and the second unique subset of the plurality of pixels, wherein the determining is based on information related to:

the plurality of second image frames at a third resolution, and the plurality of third image frames at a fourth resolution.

4. The method of claim 1, wherein the second bit rate of the second data stream is the same as a third bit rate of the third data stream.

5. The method of claim 1, further comprising:

causing, by the computing device, the user device to render a presentation of the content item at the second resolution based on combining the second data stream and the third data stream.

6. The method of claim 5, wherein causing the user device to render the presentation of the content item comprises causing the user device to generate information related to a plurality of fourth image frames, and wherein the plurality of fourth image frames is based on interleaving the plurality of second image frames with the plurality of third image frames.

7. A method comprising:

receiving, by a computing device, information related to a plurality of pixels for a content item associated with a first resolution;

encoding, by the computing device, a plurality of data streams for the content item, wherein the plurality of data streams comprises:

a first data stream comprising a plurality of first image frames, wherein each of the first image frames comprises a first subset of the plurality of pixels, and a second data stream comprising a plurality of second image frames, wherein each of the second image frames comprises a second subset of the plurality of pixels, wherein a first bit rate of the first data stream is the same as a second bit rate of the second data stream, wherein each of the plurality of data streams corresponds to a resolution that is lower than the first resolution, and wherein, for each of the plurality of data streams, the computing device is configured to maintain a bits per pixel value of a corresponding data stream within a threshold of a second bits per pixel value of another data stream of the plurality of data streams;

receiving, by the computing device and from a user device, an indication of a request for the content item at a second resolution that is lower than the first resolution;

determining, by the computing device, that interleaving the first subset of the plurality of pixels with the second subset of the plurality of pixels generates the content item at the second resolution;

sending, by the computing device and to the user device, the first data stream and the second data stream; and causing, by the computing device and based on combining the first data stream and the second data stream, the user device to render a presentation of the content item at the second resolution.

8. The method of claim 7, wherein each of the first image frames is at a third resolution, wherein each of the second image frames is at a fourth resolution different from the third resolution.

9. The method of claim 7, wherein causing the user device to render the presentation of the content item further comprises causing the user device to generate information related to a third image frame, wherein the third image frame is generated based on interleaving one of the plurality of first image frames and one of the plurality of second image frames.

10. The method of claim 9, wherein each of the first data stream and the second data stream corresponds to a same resolution, and wherein causing the user device to render the presentation of the content item comprises generating the information related to the third image frame at a different resolution, wherein the different resolution is based on interleaving one of the plurality of first image frames and one of the plurality of second image frames.

11. The method of claim 7, further comprising:

generating a third data stream corresponding to the content item, wherein the third data stream is at a third bit rate that is an addition of the first bit rate and the second bit rate.

12. The method of claim 11, further comprising:

receiving a fourth data stream corresponding to the content item, wherein a fourth resolution of image frames of the fourth data stream is different from a first resolution of image frames of the first data stream, a second resolution of image frames of the second data stream, and a third resolution of image frames of the third data stream; and generating a fifth data stream corresponding to the content item based on the third data stream and the fourth data stream, wherein a fifth resolution of image frames of the fifth data stream is different from the first resolution, the second resolution, the third resolution, and the fourth resolution, wherein each of the fourth data stream and the fifth data stream is capable of being used to independently render the presentation of the content item by the user device.

13. The method of claim 7, further comprising:

receiving, from one of a plurality of user devices, a second indication of a second request for the content item at a third resolution;

generating, based on the request, a third data stream at the third resolution, wherein generating comprises interleaving the plurality of first image frames and the plurality of second image frames; and transmitting, to the one of the plurality of user devices, the third data stream.

14. The method of claim 7, further comprising:

receiving, from one of a plurality of user devices, a second indication of a second request for the content item at a highest resolution supported by the one of the plurality of user devices;

selecting, based on the request and from the plurality of data streams, a third data stream corresponding to the highest resolution; and transmitting, to the one of the plurality of user devices, the third data stream.

15. The method of claim 7, wherein combining the first data stream and the second data stream further comprises:
generating information related to a third data stream comprising a plurality of third pixels, wherein the first data stream, second data stream, and third data stream have a same number of bits per pixel.

16. A device comprising:
one or more processors; and
memory storing instructions that, when executed by the one or more processors, cause the device to:
receive information related to a plurality of pixels of a content item associated with a first resolution;
receive, from a user device, an indication of a request for the content item at a second resolution that is lower than the first resolution;
determine that the user device is capable of rendering the content item at the second resolution;
access a plurality of data streams comprising:
a first data stream comprising a plurality of first image frames, wherein each of the first image frames comprises a first unique subset of the plurality of pixels, and
a second data stream comprising a plurality of second image frames, wherein each of the second image frames comprises a second unique subset of the plurality of pixels,
wherein each of the plurality of data streams corresponds to a resolution that is lower than the first resolution, wherein a first bit rate of the first data stream is the same as a second bit rate of the second data stream, and wherein, for each of the plurality of data streams, the device is configured to maintain a bits per pixel value of the corresponding data stream within a threshold of a second bits per pixel value of another data stream of the plurality of data streams;
determine that interleaving the first unique subset of the plurality of pixels with the second unique subset of the plurality of pixels generates the content item at the second resolution; and
send, to the user device, the first data stream and the second data stream, wherein the sending permits the user device to render a presentation of the content item by combining the first data stream and the second data stream.

17. The device of claim 16, wherein the instructions, when executed by the one or more processors, further cause the device to:
encode the first data stream by downsampling the plurality of pixels to create the first unique subset of the plurality of pixels; and
encode the second data stream by downsampling the plurality of pixels to create the second unique subset of the plurality of pixels,
wherein the first data stream and the second data stream are encoded prior to receiving the indication.

18. The device of claim 16, wherein the instructions, when executed by the one or more processors, further cause the device to:
encode the first data stream by averaging information related to the first unique subset of the plurality of pixels; and
encode the second data stream by averaging information related to the second unique subset of the plurality of pixels,
wherein the first data stream and the second data stream are encoded prior to receiving the indication.

19. The device of claim 16, wherein the instructions, when executed by the one or more processors, further cause the device to:
encode, prior to receiving the indication, the first data stream and the second data stream, wherein encoding comprises generating information related to the first unique subset of the plurality of pixels and the second unique subset of the plurality of pixels,
wherein the first unique subset of the plurality of pixels and the second unique subset of the plurality of pixels have a same number of bits per pixel.

20. The device of claim 16, wherein the instructions, when executed by the one or more processors, further cause the device to:
generate a third data stream corresponding to the content item, wherein the third data stream is at a third bit rate that is an addition of the first bit rate and the second bit rate.

* * * * *

UNITED STATES PATENT AND TRADEMARK OFFICE
CERTIFICATE OF CORRECTION

PATENT NO. : 10,284,908 B2
APPLICATION NO. : 13/777830
DATED : May 7, 2019
INVENTOR(S) : Yasser F. Syed Page 1 of 1

It is certified that error appears in the above-identified patent and that said Letters Patent is hereby corrected as shown below:

In the Specification

Column 11, Detailed Description, Line 5:
Please delete "device" and insert --system--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*